Dec. 25, 1934.    F. C. WORDEN    1,985,359
TRANSMISSION MECHANISM
Filed May 8, 1931    5 Sheets-Sheet 1

Fig. 2.

Dec. 25, 1934.  F. C. WORDEN  1,985,359
TRANSMISSION MECHANISM
Filed May 8, 1931  5 Sheets-Sheet 4

Fig. 4.

INVENTOR
Fulton C. Worden
BY Conrad A. Dietrich
his ATTORNEY

Patented Dec. 25, 1934

1,985,359

UNITED STATES PATENT OFFICE 1,985,359

TRANSMISSION MECHANISM

Fulton C. Worden, New York, N. Y.

Application May 8, 1931, Serial No. 535,832

22 Claims. (Cl. 74—336.5)

This invention relates to power transmission and control mechanism for automotive vehicles and the like, and refers more particularly to such mechanisms wherein certain speed changes are effected automatically to maintain a desired torque-load ratio between a driving shaft and a driven shaft.

One object of the invention is to provide a multiple-speed-change transmission gear mechanism with means for automatically selecting a proper gear ratio to meet given requirements or conditions such as known variations in the load on a driven shaft.

Another object is to provide such a mechanism in which the gear selecting means is automatically controlled upon the occurrence of predetermined rates of speed of a driven shaft.

Another object is to provide such a transmission gear system in which the several gear sets are engaged and/or disengaged in a definite predetermined and desired sequence by automatically acting means.

The foregoing and other objects, features and advantages of the invention will be readily understood from the following description in conjunction with the accompanying drawings, wherein a preferred embodiment is shown by way of illustration, and wherein

Fig. 6 is a diagrammatic development of a control member.

Referring now to the drawings in detail, it will be seen that the invention has been shown as applied to a wheeled vehicle such as an automobile wherein a chassis frame 1 constitutes a support for the novel transmission mechanism 2 which is adapted to provide driving connection between the crank or other main shaft of a motor 3 and a propeller shaft 4 having the usual universal joint connections and leading to the differential and the rear axle 5. A friction clutch 5ª of any ordinary or preferred form is operatively connected between the motor and the transmission mechanism and is adapted to be automatically released and reengaged as required, and as will be more fully explained hereinafter. The transmission mechanism is controlled by a speedometer 6 which may be mounted on the dashboard 7, and has associated with it certain electrical control members which will also be later described.

The transmission mechanism 2 is preferably of the multiple speed selective gear type by which different speed ratios may be obtained between the engine crank shaft and the propeller shaft 4, and comprises a main casing or housing 10 rigidly secured to the chassis and the engine crank case 10ª. From the driven clutch member extends a stub shaft 11 which projects through and is journalled at 11ª in alined openings through the casings 10 and 10ª. Journalled in the opposite or rear end wall 12 of the casing 10, concentric with shaft 11, is a splined shaft 13 secured to the propeller shaft by a universal joint 13ª. The free inner or forward end of shaft 13 is journalled on suitable bearings as at 13ᵇ, in an axial socket or bore provided in the inner or rearward face of a gear wheel 14 which is rigid with, and preferably integrally formed on, the free rearward end of shaft 11 and which is located within the housing 10. The gear wheel 14 is constantly in mesh with a gear wheel 14ª journalled on a shaft 15 supported in the end walls of casing 10 and extending parallel to and below the coaxially alined shafts 11, 13. On the shaft 15 is sleeved and journalled an idler shaft 15ª having rigidly fixed or integrally formed thereon the gear wheel 14ª and gear wheels 16, 16ª and 16ᵇ, the gear wheel 16ᵇ being in mesh with a gear wheel 17 mounted on a stub shaft 17ª, which gear is the reverse gear of the transmission. Splined on the shaft 13 to slide longitudinally thereon are gear wheels 18 and 19, the gear wheel 18 being a compound internal-external gear having its internal teeth 18ª operable to engage with the teeth of the gear wheel 14 to lock shafts 11 and 13 together. The shifting of the gear wheels 18 and 19 is effected through yokes 20 and 21 respectively by automatic electro-mechanical means arranged in part on top of the casing 10, and functioning to maintain a definite torque-load ratio between the shafts 11 and 4 so that the vehicle will be driven efficiently within predetermined successive speed ranges irrespective of the load and without overburdening the motor. The relative arrangement of the gears 14 to 19 inclusive, and the sequence in which they are brought into operation are the same as in the ordinary hand controlled automotive transmission systems, and, therefore, require no further detailed elaboration at this time.

I will now describe the automatic electromechanical means for actuating the transmission mechanism. The clutch 5ª, which is normally engaged, may be released through the medium of a yoke 23 secured to a rock shaft 24 and having one arm engaging the releasable clutch member and having its other arm 25 extending upwardly through an opening 26 (Fig. 2) in the clutch or crank case housing 10ª. The upper end of said arm 25 is bifurcated to provide parallel arms having alined longitudinal slots 27 to receive a pin 27ª carried by the forward end of a substantially-horizontal and longitudinally-slidable push rod 28 which is disposed over the casing 11 and supported in bearing blocks 29, 29ª, carried rigidly by the chassis. The other or rearward end of the rod 28 is bifurcated and pivoted, as at 30, by a pin and slot connection to one end of a laterally-extending lever 31 which seats in the bifurcation, the other end of lever 31 being pivoted, as at 32, to a slidable curved block 33 (Fig. 3) which travels in a similarly curved slot 33ª in a slideway member 33ᵇ rigid with housing 10. Intermediate its ends, the lever 31 carries a circular cam roller or disc 34 rotatably supported on a pin 34ª, one side or edge portion of which is adapted to extend through an opening 35 in the casing 10 such that the periphery of said roller may be engaged by a cam 36 to rock the lever 31 and thus to shift the rod 28 in a manner and for a purpose to be described.

The cam 36 is formed on the forward edge or face of a ring member 36ª, the body portion of which seats in and is rotatably disposed in the grooved forward face of an internal ring gear wheel 37 rotatably supported in the rear end of the casing 10 on bearings 37ª and by thrust bearings 37ᵇ. The gear wheel 37 surrounds the shafts 13 and 15, and is in mesh with the idler gear 16ᵇ, so as to be driven continuously when the engine is running and the clutch is engaged. A plurality of spaced, clutch elements 38 are disposed between the cam ring 36ª and the gear wheel 37 so that the ring and gear wheel 37 will rotate together in one direction under the driven force of the ring wheel 37 and so that the cam 36 can continue to rotate of its own momentum when the gear wheel 37 stops. Although the ring gear rotates continuously, the rod 28 is normally stationary and is only moved through one reciprocation during each gear shifting operation, due to the fact that under normal operating conditions of the vehicle, the roller 34 is held out of engagement with the cam 36, and in its forward position by a laterally extending latch member 40 which normally seats in a socket 40ª in the block 33 and which is carried by a lever 41 at a point rearwardly of the fulcrum, the lever being pivotally supported, as at 41ª, on the slideway member 33ᵇ. The end of the lever arm which carries member 40 is upwardly offset and the end thereof is received in a socket 42 in the reciprocable core or armature 42ª of a solenoid 42ᵇ positioned above block 33 and which is rigidly carried by an arm 42ᶜ from the casing 10. The free or forward arm of lever 41 terminates in a lateral hook or catch 43 cooperable upon energization of solenoid 42ᵇ and outward movement of core 42ª with a notch or kerf 43ª in the forward substantially vertical face of block 33. A spring 44 under tension is connected to the free forward end of lever 41 adjacent hook 43 and to the member 33ᵇ so that spring 44 normally tends to disengage the catch 43 and to engage the latch member 40. Acting on the lever 31 is a spring 45 preferably of the coil type, under tension and secured at its ends to the block 33 and to the casing 10 so that it normally tends to move the block 33, and therefore lever 31, rearwardly about the pin 30 so as to bring the notch 43ª rearward of hook 43 and the cam disc 34 into operative engagement with the cam 36.

Figure 1:
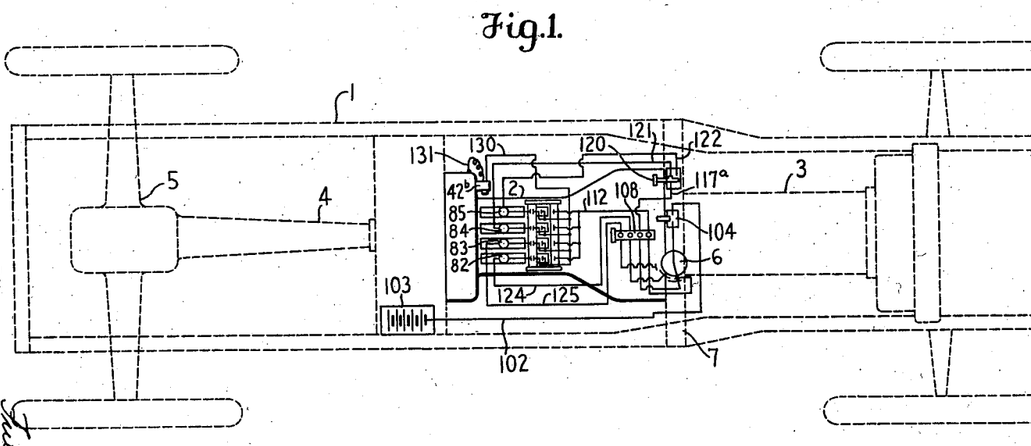
Figure 1 is a diagrammatic top plan view of a motor vehicle chassis equipped with power transmission and a control mechanism therefor embodying the invention.
Figure 2:
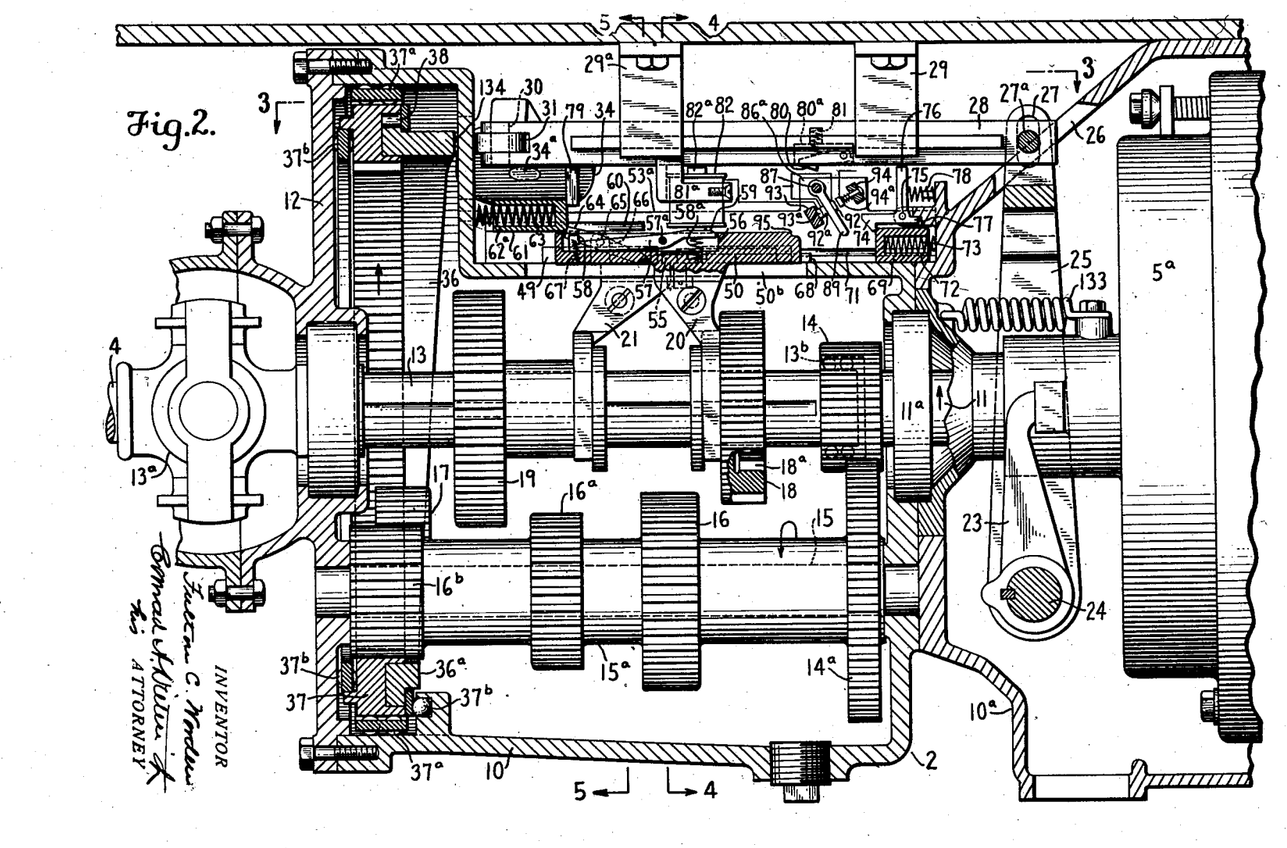
Fig. 2 is a vertical longitudinal sectional view through the gear case and associated parts, the section being taken approximately on line 2—2 of Fig. 5.

Supported on the top face of the top wall of casing 10 are laterally-spaced yoke-operating plate or bar members 50, 51 which are longitudinally reciprocable substantially parallel to the bar 28 and which are guided by outside bars 49 and an intermediate bar 49ª which are rigid with casing 10. Depending from the underfaces of members 50, 51 are flanges 50ª, 51ª respectively which project through longitudinal guide slots 50ᵇ, 51ᵇ in the top wall of the casing and which are rigidly secured to the yokes 20, 21, respectively. Also slidably supported for longitudinal reciprocation on the top wall of housing 10 and positioned substantially parallel to and on opposite sides of the pair of members 50, 51 are reciprocable counter-plate or bar members 52, 53 which bear along their inner sides against the bars 49. The outer sides of members 52, 53 are held against vertical movement and guided by longitudinal upward extending guide plates 52ª, 53ª respectively. The opposing faces of members 50, 52 and 51, 53 are each provided with a toothed rack portion 54, the pairs of opposed racks meshing respectively with pinions 55, 55ª positioned in gaps in the bars 49 substantially midway of their lengths, the pinions being carried by vertical shafts journalled in the top wall of casing 10, (see Fig. 4). By this arrangement, it is apparent that movement imparted to either of the bar members of a pair will cause simultaneous movement of the other of that pair of bar members in the opposite direction, due to the interposed pinion. In the top face of each of the bar members 50, 51, 52 and 53 is a longitudinal groove or recess 56 positioned adjacent the rear ends of the bar members. In the grooves 56 are latch or lever members 57 pivotally supported intermediate their ends on transverse pins 57ª or otherwise fulcrumed for rocking or swinging movement in a vertical plane. The rear ends of members 57 have upward extending abutment portions 58, the top faces of which normally lie flush with or below the plane of the top faces of the bar members and are so held by compression springs 58ª positioned in the recesses 56 and under the forward extending portions 59 of members 57 which comprise operating or control fingers or keys for a purpose to be described. In the inside vertical faces of the guide plates 52ª, 53ª at the rear portions thereof are substantially horizontal opposed bearing grooves or guide slots 60 which are above the plane of the bar members. Reciprocably supported for movement longitudinally of the bar members and closely adjacent the top faces thereof is a pusher or actuator bar 61 extending transversely between the plates 52ª, 53ª and having lateral supporting flanges 62 riding in the guide slots 60. In the rear face of the bar 61 are sockets or bores 62ª in which are positioned coil springs 63 which at their free outer ends are centered on pins and abut against a vertical wall of the housing 10. The springs 63 are held under compression and the bar 61 is held in its normal rear position (Fig. 2) by a resiliently supported detent or trip member 64 which is positioned between the bar members 50, 51 and pivoted on a horizontal pin 65 positioned between and supported in vertical posts 66 which also serve to space the members 50, 51. The forward end of the trip member 64 normally rests on the top wall of casing 10 and is so held by the light compression spring 67. Cooperating with the forward end of member 64 to actuate and depress the rear end thereof for release of the actuator bar 61 is a rod or plunger 68 which extends forward of and is positioned between members 50, 51 and is slidable on the top wall of the casing. The plunger 68 is normally held in and returned to the position of Fig. 2 by resilient means and has its rear end downward beveled or inclined for operable lifting engagement with the upwardly and forwardly inclined or beveled end of the trip member 64. Forwardly of the bar members is a pusher or restoring bar 69 which may rest for sliding movement on the top wall of casing 10 and which is guided for longitudinal reciprocation by lateral flanges 70 seating in opposed horizontal guide slots or grooves 71 in the forward portions of the inside vertical faces of the plates 52ᵃ, 53ᵃ. In the front or forward face of bar 69 are sockets or bores 72 in which are positioned coil springs 73 having their free ends centered by pins and abutting a vertical face of the casing 10ᵃ. The springs 73 are held under compression and the bar 69 is held in retracted position (Fig. 2) by a latch member 74 pivoted as at 75 on an arm rigid with the casing 10ᵃ. The member 74 is preferably a bell crank, having a horizontal latch arm and an upwardly extending trip arm 76 which terminates directly beneath and adjacent the bar 28. The member 74 has a stop lug 77 which limits its movement toward locking position to which it is normally urged by a spring 78. Carried by the bar 28 and depending from the underface thereof is a lug member 79 which extends downward into the path of movement of the actuator bar 61 and which is operable to return the same to its normal position (Fig. 2). Also projecting from the under face of the bar 28 is a trip member or dog 80 which is pivotally supported in a bar recess 80ᵃ and urged into a down position for engagement with the trip arm 76 by a spring 81 positioned in said recess.

The bearing block 29ᵃ rigidly supports a depending bracket member 81ᵃ which extends transversely across and above the bar members. Mounted in vertical apertures through member 81ᵃ are a plurality of solenoids 82, 83, 84 and 85, having their vertically reciprocable cores or armatures 82ᵃ, 83ᵃ, 84ᵃ and 85ᵃ respectively positioned over the bar members and centered over the control fingers or keys 59 when the transmission mechanism is in "neutral", i. e. the ends of the bar members, which are of equal length, are transversely alined. Forward of the bracket member 81ᵃ and secured to the top faces of guide plates 52ᵃ, 53ᵃ are oppositely disposed upright supporting members 86, 86ᵃ. Extending between and having its ends secured to the members 86, 86ᵃ is supporting rod 87 which is positioned above and transversely to the bar members and on which are journalled for free gravitational movement, a plurality of depending switch levers 88, 89, 90 and 91, preferably of insulating material, which are spaced apart, being positioned in the planes of the paths of travel of the bar members 52, 50, 51 and 53 respectively. Carried by each switch lever, below its fulcrum, are contacts 92, 92ᵃ positioned on the forward and rear faces thereof respectively. Positioned above and below the contacts 92, 92ᵃ in an upward and forward inclined plane are spaced supporting bars 93, 94 which are substantially parallel to rod 87 and have their ends secured to the supporting members 86, 86ᵃ. Carried by the bar 93, and cooperating with and normally engaging each of the contacts 92ᵃ are contacts 93ᵃ which normally serve to support the levers 88, 89, 90 and 91 in a downward and rearward inclined position. Carried by the bar 94 are a plurality of contacts 94ᵃ cooperable with contacts 92 and normally out of contact therewith, the contacts 94ᵃ preferably being resiliently supported to permit overtravel of the levers 89 on their forward and upward movement. The free depending ends of levers 89 extend into the path of travel of raised portions 95 on the forward ends of the bar members, so that the portions 95 on forward movement of the bar members will engage the depending ends of their respective levers 89 to break circuit at contacts 92ᵃ, 93ᵃ and make contact between contacts 92, 94ᵃ.

Figures 3, 4:
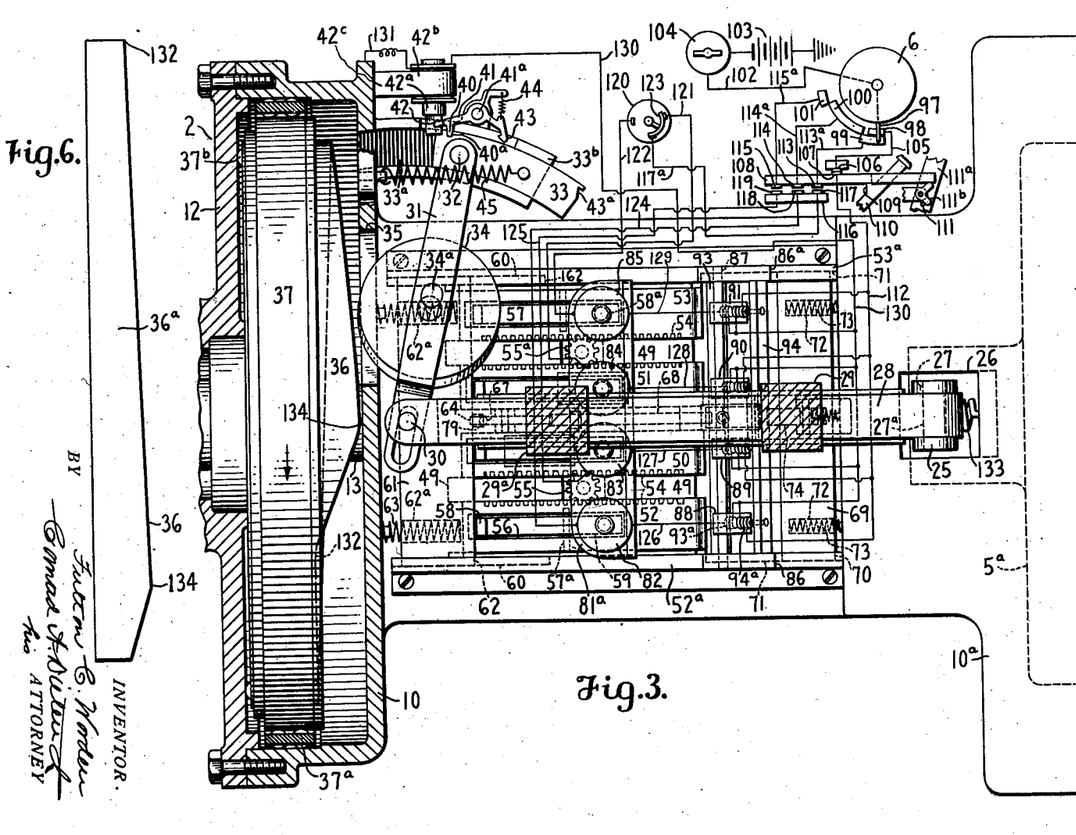
Fig. 3 is a sectional plan view of the same taken on line 3—3 of Fig. 2.
Fig. 4 is a vertical transverse sectional view on line 4—4 of Fig. 2.
Figure 4:
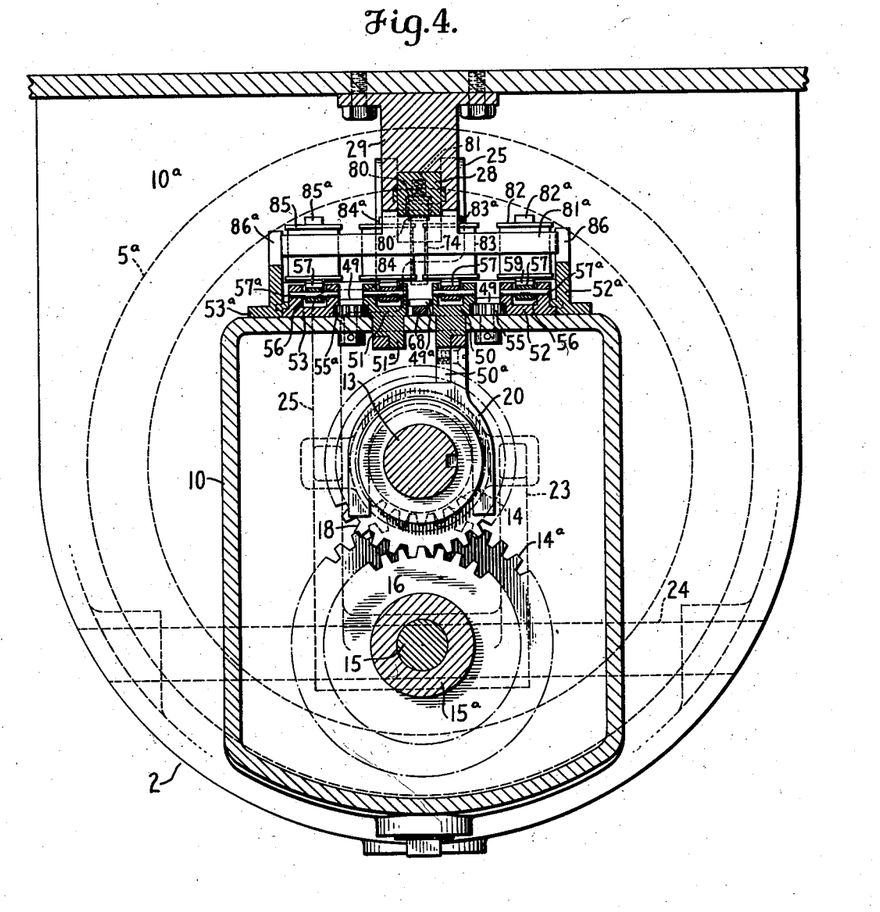
Figure 5:
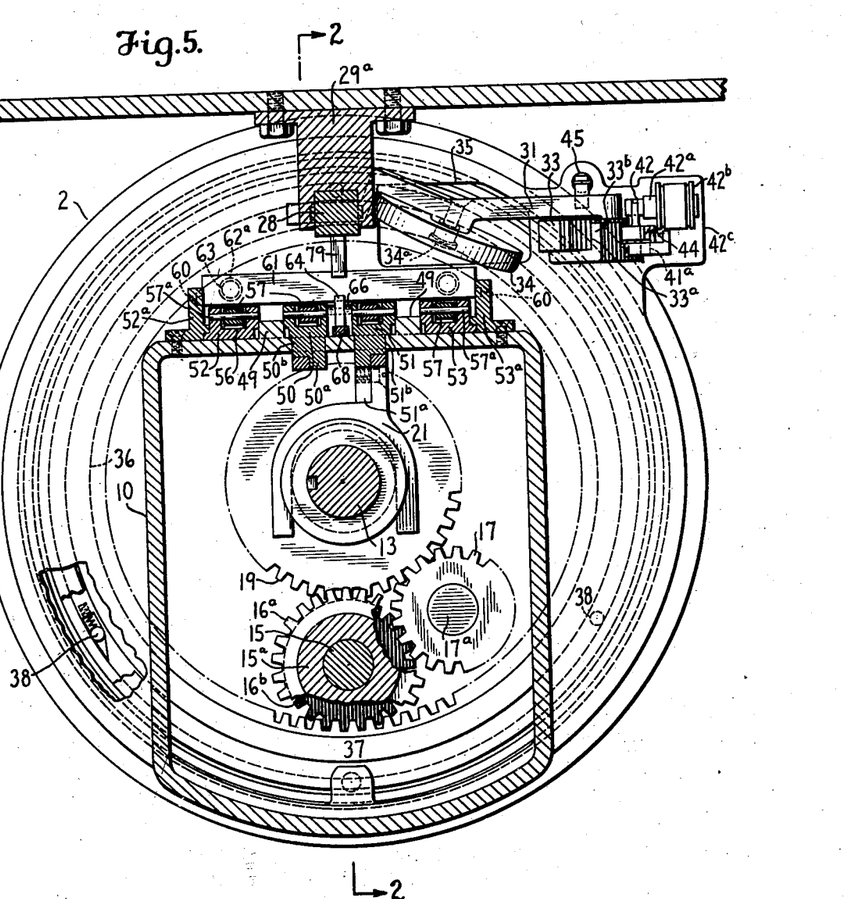
Fig. 5 is a vertical transverse sectional view on line 5—5 of Fig. 2.

The speedometer 6 has operatively associated therewith and driven thereby in any suitable manner, a switch arm 97 which is slidable over and in contact with switch segments or contact elements 98, 99, 100 and 101 which are insulated from each other and which respectively correspond to "neutral", low or first gear, second or intermediate gear, and high or third gear of the transmission mechanism. The segments 98 and 99 are positioned in partly overlapping relation so that at zero speedometer reading and for a predetermined minimum range of travel of arm 97 therefrom both of the segments will be simultaneously in contact with arm 97. The segments may be of any desired and predetermined length proportioned to car speed, such for example that arm 97 will be on segment 98 from zero to two miles per hour, on segment 99 from zero to three miles per hour, on segment 100 from three to twelve miles per hour, and on segment 101 from twelve to fifteen miles per hour. The switch arm 97 is connected by a conductor 102 to a source of current 103 such as the ignition storage battery by the motor igniton switch 104 so that the circuit to the arm 97 is closed when the ignition is turned on. Connected to the neutral segment 98 is a lead wire 105 which terminates at a fixed contact 106 cooperating with a contact 107 carried by a switch bar 108 preferably of insulating material. The bar 108, which is suitably supported for vertical movement, is normally held in raised position (Fig. 3) by a lug or arm 109 carried on or operable by the accelerator pedal 110 when the pedal is released and in engine idling position. The bar 108 is also held in its raised position when the emergency brake is on, for example by a pin 111 on the brake lever 111ᵃ acting through a gravity returned pivoted bell crank member 111ᵇ having one arm operable to engage the bar 108, as clearly shown in (Fig. 3). From the contact 107 extends a lead 112 which is tapped in series to the resiliently supported contacts 94ᵃ. On the underside of the switch bar 108 are a plurality of spaced contacts 113, 114, and 115 which are connected by lead wires 113ᵃ, 114ᵃ, and 115ᵃ to the segments 99, 100 and 101 respectively. Directly beneath the bar 108 is a fixed contact supporting member 116 preferably of insulating material and carrying contacts 117, 118 and 119 which are simultaneously engageable by the contacts 113, 114 and 115, respectively, upon downward movement of the bar 108 when released by both the emergency brake and the accelerator pedal. From the contact 117, a lead 117ª carries back to a manual switch 120, preferably mounted on the dash board, at which the current may be directed to either of two circuit leads 121 or 122 by means of a switch blade 123. The leads 121, 122 extend to the low or first gear controlling solenoid 84 and to the reverse gear controlling solenoid 85 respectively. The contacts 118, 119 are connected to the second gear controlling solenoid 82 and to the third or high gear controlling solenoid 83 respectively by conductors 124, 125. The free ends of the solenoid windings 82, 83, 84 and 85 are connected by lead wires 126, 127, 128 and 129 respectively to their respective independent contacts 93ª which, as above noted, are normally engaged by the lever carried contacts 92ª. The contacts 92 and 92ª are electrically connected together in any suitable manner, the pairs then being tapped in series to a conductor 130 leading to the clutch controlling solenoid 42ᵇ which is grounded to the frame or chassis by a lead 131. It may be noted that the negative terminal of the battery 103 is grounded to the frame to complete the above described circuits.

The operation of my transmission mechanism will now be described:—

The ignition having been turned on and the motor started, the emergency brake being on, the engine may be warmed-up without actuating the automatic gear shifting mechanism, since the emergency brake acting through the bell crank member 111ᵇ will be holding the contact bar 108 in raised position. The switch blade 123 of the reversing switch 120 being in the position of Fig. 3, the circuits are arranged for automatic shifting of the gears for forward car travel. Upon deceleration of the car to two miles per hour, the gears will be automatically placed in "neutral" position, as will be described, and therefore when the engine is started the gears will be in "neutral", as shown in the drawings. The circuit from the battery 103 through the speedometer arm 97 is broken at contacts 113, 114, 115 and at contacts 94ª. With the engine or motor warmed-up and the accelerator pedal 110 released and in the position of Fig. 3, the emergency brake is released so that the bar 108 is now held in its raised position only by the accelerator pedal lug 109. The shaft 11 will be driving the ring gear wheel 37 through gear wheels 14, 14ª, shaft 15ª and gear wheel 16ᵇ in mesh with gear wheel 37. To start the car or drive the shaft 4, the accelerator pedal 110 is depressed, the emergency brake being "off", which on initial downward movement breaks circuit at contacts 106, 107 and makes contact between 113 and 117, 114 and 118, and 115 and 119 due to release of bar 108. A circuit will now be completed from the battery 103 through arm 97 switch segment 99 lead 113ª, contact 113, 117, lead 117ª, switch 120, lead 121, solenoid winding 84, lead 128 and its closed contacts 93ª, 92ª to lead 130, through solenoid winding 42ᵇ and lead 131 to the frame thus completing the circuit. Energization of solenoid 84 will force its armature downwardly onto finger or key 59 of the low speed control bar member 51 compressing spring 58ª and lifting abutment 58 into the path of movement of actuator bar 61. The clutch solenoid 42ᵇ will also be energized, retracting its armature 42ª which will pull latch member 40 out of socket 40ª permitting spring 45 to pull block 33 rearward as the cam 36 rotates until at the low point 132 of the cam, the block 33 passes to the rear of hook 43 which under the force of solenoid 42ᵇ moves into holding position in front of notch 43ª, tensioning spring 44. As the cam engaging disc 34 starts to move lever 31 forward, it will turn initially about pin 30 until hook 43 engages in notch 43ᵃ when the block 33 will be held fixed and the forward motion of the lever 31 will be about pin 32. The lever 31 can only turn about pin 32 by forcing the clutch releasing bar 28 forward against the force of the clutch spring 133, the bar acting as it is pushed forward through the yoke arm 25 to release the clutch. As the bar 28 approaches its full length of forward travel, the trip member 80 carried thereby engages the trip arm 76 compressing spring 78 and releasing the restoring bar 69. The energy stored in spring 73 forces the released bar 69 rearwardly which strikes and carries with it the plunger 68 to thereby depress the rear end of detent member 64 which releases the actuator bar 61, the lug 79 having moved forwardly with the bar 28. As the bar 61 moves forwardly under the force of springs 63 which are sufficiently strong to overcome the springs 73 and cause engagement of the gears, the bar will engage the raised lug 58 and push bar member 51 and its yoke 21 forwardly until the bar 61 reaches the end of its travel determined by the length of grooves 60 when the gear wheel 19 will be engaged with the gear wheel 16ª and the transmission will be in low or first gear. As the bar member 51 is moved forward, the restoring bar 69 which is in abutting engagement with the forward end thereof will be moved forward until it comes into the position of Fig. 2 when the latch member 74 which is lifted by engagement of the bar 69 with the inclined face thereof snaps down into bar locking position (Fig. 2). The raised portion 95 of bar member 51 on its forward movement engages the alined lever 89 breaking contact at 92ª, 93ª and making contact between contacts 92, 94ª, the circuit through contacts 92, 94ª, however being broken at open contacts 106, 107 as above noted. Breaking of the circuit at contacts 92ª, 93ª deenergizes solenoids 84 and 42ᵇ, so that the springs 58ª and 44 can function at the proper time. The foregoing sequence of operations takes place almost instantaneously and during less than a complete revolution of the cam ring 36ª. It may be noted that although the ring gear 37 stops rotating when the clutch is disengaged that the cam member 36ª which is automatically released from the clutch elements 38 continues to rotate rapidly due to its inertia. As the cam disc 34 passes the high point 134 of the cam 36, the clutch is gradually reengaged due to the gradual slope of the cam face. The reengagement of the clutch takes place under the force of the clutch spring 133 as the cam 36 relieves the lever 31, the lug 79 engaging the front face of the actuator bar 61 and moving it rearwardly as the bar 28 returns to its initial normal position. When bar 61 has been forced back its full distance, compressing the springs 62ª, it will pass beyond, the detent 64 which will snap up into bar locking or holding position under the force of spring 67. Just prior to the cam low point 132 reaching the disc 34, the clutch will be fully reengaged and shaft 11 will now drive through gears 14 and 14ª, gears 16ª and 19 to the shaft 13 and to the shaft 4 and rear axle 5 starting the car in motion and will again take up the drive of the ring gear wheel 37 and cam member 36ª. As above noted, the cam low point 132 has not at this time reached the disc 34, so that the lever 31 continues to move rearwardly, but now pivots on the pin 30 under the force of spring 45 which pulls the block 33 rearward sufficiently to disengage notch 43a from hook 43. As soon as the hook 43 is disengaged, the spring 44 lifts it out of the path of block 33 and depresses the rear end of lever 41 and pulls the armature 42a from the deenergized solenoid 42b until stopped by engagement of the latch member 40 with the block 33. When the rotating cam starts its next cycle of rotation, forcing the disc 34 forward the block 33 will not be locked against forward movement and the lever 31 will pivot on pin 30 tensioning spring 45 and moving block 33 forward until as the cam high point 134 reaches disc 34, the socket 40a comes into register with latch member 40 which seats therein under the force of spring 44 thus locking the disc 34 out of engagement with the cam 36 and completing the shifting of the gears from "neutral" to "low" or first gear.

As the car gathers speed upon depression of the accelerator pedal and accelerates to say three miles per hour then the switch arm 97 will leave the segment 99 and make contact with segment 100, which causes the transmission to be shifted into "intermediate" or second gear, as follows: The circuit will now be completed through lead 124, solenoid 82, lead 126 and its engaged contacts 93a, 92a, lead 130, clutch solenoid 42b, and lead 131 to the frame. Solenoid 82 will act on its key 59 to lift its abutment 58 into the path of the actuator box 61. Solenoid 42b will be energized to release block 33 for latching in rear position by hook 43 as above described, so that bar 28 will be forced forward disengaging the clutch and tripping latch member 74 to release the restoring bar 69. As the restoring bar now moves rearward under the force of springs 73, the bar will engage the plate or bar member 51 and carry it rearward thereby disengaging the gears 16a and 19. As the bar comes near the end of its travel, it will engage the plunger 68 and depress the detent 64 as the bar member ends are transversely alined. The released actuator bar 61 now engages the raised abutment 58 of bar member 52 and drives the member 52 forward, the raised portion 95 of member 52 acting on its alined lever 89 to break contact between its contacts 93a, 92a and make contact between contacts 92 and 94a, but circuit to the clutch solenoid 42b will be broken at contacts 106, 107 as above described when shifting into low gear. The bar member 52 as it moves forward rotates the pinion 55 which simultaneously drives the bar member 50 rearwardly and since the member 50 carries the yoke 20, the gear wheel 18 will be slid rearwardly on shaft 13 and into mesh with gear wheel 16 which has stopped rotating due to disengagement of the clutch. As the cam high point 134 passes the disc 34, the clutch will gradually reengage, forcing the actuator bar 61 back to the position of Fig. 2 and finally the block 33 will be permitted its increment of rearward movement to release hook 43, so that on the next or following revolution of cam 36 the block 33 and disc 34 will be returned to normal position (Fig. 3) as above described. The transmission mechanism will now be in second or intermediate gear, and the car will proceed in that gear until the switch arm 97 reaches the end of segment 100 and comes onto the segment 101 say at about twelve miles per hour car speed.

When arm 97 makes contact with segment 101, circuit will be completed through lead 125 solenoid 83, lead 127 and its contacts 92a, 93a, lead 130, solenoid 42b, and lead 131 to the frame. The steps traversed by the mechanism will be the same as described above in going from "low" to "intermediate" save that the abutment 58 of bar member 50 will initially come up against the underside of bar 61 and will snap into the path of the bar 61 as the bar member 52 and therefore bar member 50, through pinion 55, are returned to neutral transversely alined position by the restoring bar 69 and just prior to release of bar 61 by the detent 64. This will put the transmission in high gear and when the car speed has exceeded say fifteen miles per hour the arm 97 will leave the segment 101; but as is apparent this will not affect the setting of the transmission mechanism.

Change from "high" to "intermediate" to "low" and then to "neutral" is accomplished in the same manner and with the same series of steps for each transition as above described in going from "neutral" through "low" and "intermediate" to "high" gear save that the energizing circuit for the transition from "low" to "neutral" differs as follows: When in "low" gear, the bar member 51 will be forward thus breaking the circuit at 92a, 93a and making circuit at contacts 92, 94a, then as the arm 97 comes onto the segment 98 and the accelerator pedal is released to bring the car to a stop, the bar 108 will be raised and a circuit will be completed from the battery through arm 97 segment 98, lead 105 engaged contacts 106, 107, lead 112, contacts 94a, 92 which are cooperable with bar member 51, lead 130, the clutch solenoid 42b, and lead 131 to the frame. The lifting of bar 108 breaks the circuits of the solenoids 82, 83 and 84 and solenoid 85 is cut out by switch 120 so that none of the abutments 58 will be raised. Therefore, as the clutch is released by bar 28, and the restoring bar 69 returns the bar member 51 and its gear wheel 19 into neutral position (Fig. 2), the released actuator bar 61 will pass over all of the bar members without any operative effect and be returned by the lug 79 to its normal position (Fig. 2) without shifting the transmission out of "neutral".

There remains to be described, the reverse gear operation which is substantially similar to the shift from "neutral" to "first" and back from "first" to "neutral". This is accomplished by manual operation of the switch 120 to place blade 123 across the leads 122 and 117a. Then with the arm 97 at substantially zero position as the engine is sufficiently accelerated to drop the bar 108 to make contact between contacts 113 and 117, current will flow from the battery through arm 97 leads 113a and 117a to the switch 120 and thence through lead 122 solenoid 85, lead 129 and its contacts 92a, 93a, lead 130, solenoid 42b, and lead 131 to the frame. The operation and sequence of steps of the shifting mechanism is as above described, the bar member 53 being moved forward and through pinion 55a shifting bar member 51 and its gear wheel 19 rearwardly into mesh with gear wheel 17 so that the interposed gear wheel 17 between the gear wheels 16b and 19 caused reverse rotation of shaft 13. The transmission may now be returned to "neutral" if it is desired to stop the car or may be made to automatically shift to "low" gear if it is desired to proceed ahead. When the accelerator pedal 110 is released so that lug 109 lifts bar 108, a circuit will be completed from the battery through arm 97, contacts 106, 107, lead 112, closed contacts 94a and 92 which are so held by raised portion 95 on bar member 53, lead 130, solenoid 42b and thence to the frame. This will energize solenoid 42b and none of the solenoids 82, 83, 84 or 85 so that the transmission will be returned to neutral as described above in returning from "low" to neutral. Should it be desired to go into low from reverse, the hand switch 120 may be returned to the position of Fig. 3 without releasing the pedal 110 and since the bar 108 is in down position, the solenoid 84 will be energized and the operation of the automatic mechanism on bar member 51 through bar member 53 and pinion 55 will be similar to the transition from "high" to "intermediate" above described.

Should it be desired to drive the car in "low" gear or "intermediate" at a speed beyond the speed range within the limits of that particular speedometer switch segment, it is only necessary to get the transmission into that particular gear ratio by the automatic shifting mechanism, as above described, and then to take control of the engine or carburetor throttle by the usual hand throttle lever to maintain the arm 97, through car speed, on the particular gear ratio segment as the accelerator pedal 110 is released and lifts bar 108 to its raised position. It is then possible to drive the car at any speed above two miles per hour or such speed as will cause contact between arm 97 and segment 98, as the bar 108 is in raised position and therefore arm 97 in contacting any of the segments other than segment 98 cannot complete a circuit through any of the solenoids to change the gear ratio. However, by reason of the fact that the circuit through the clutch solenoid 42$^b$ is only broken due to switch arm 97 being off the contact 98, as soon as the car speed drops to say two miles per hour and contact is made between 97 and 98 the transmission will be shifted to "neutral" from any gear ratio in which the car was proceeding under hand throttle control, as above described in going from "low" to "neutral" which will advantageously prevent stalling of the engine. This shifting from any ratio to neutral occurs since the bar members 50, 51 and 52 when in forward position will have closed its respective contacts 92, 94$^a$ to the clutch solenoid 42$^b$ and therefore when contact is made at 97, 98, the gears will be returned to "neutral".

When the car is stopped by application of the brake which raises the bar 108 contact will be made at 106, 107 the car will be proceeding in the gear ratio to which it has been automatically placed, and therefore as the car speed decreases to say 2 miles per hour and the arm 97 makes contact with the segment 98 the circuit will be completed through the clutch solenoid 42$^b$. This will place the gears directly in neutral as above described under manual throttle control.

I wish it to be understood that the above description is to be taken merely as explanatory of the operation, as the mechanism is primarily designed for controlling the torque-load ratio of a driven shaft. It is also to be noted that the mechanism may be controlled by the speed of rotation of the propeller shaft 4 or by means responsive to the load placed upon the shaft 4.

Having thus described my said invention, what I claim and desire to secure by Letters Patent is:

1. An automotive power transmission mechanism comprising, in combination, a driving shaft and a driven shaft, a plurality of gear sets having gear wheels adapted for selective engagement and disengagement to connect the shafts, clutch means in said driving shaft, means for releasing said clutch means, gear shifting yokes operatively connected to certain of said gear wheels, reciprocable plate members connected to said yokes, spring-actuated means for moving said plate members to cause engagement of said sets, a cam member operable by said driving shaft for actuating the said clutch releasing means, means normally acting to hold said releasing means in inactive position, means operable upon actuation of said clutch releasing means for controlling the operation of said spring actuated means, electrically operated means for automatically actuating said holding means thereby to release said clutch releasing means, and automtically operable means actuated upon release of said clutch means to disengage said gear sets, substantially as specified.

2. A transmission mechanism of the character described comprising a driving shaft, a driven shaft, cooperable gear wheels carried by said shafts, clutch means in said driving shaft, electrically controlled cam actuated means for disengaging and engaging said clutch means in sequence, automatic means operable to disengage the gear wheels, means actuated by said cam actuated means to release said automatic means, a second automatic means operable to move certain of said gear wheels into engagement, means operable by said first-named automatic means to release said second-named automatic means, and electrically controlled means for predetermining said certain gear wheels to be engaged, substantially as specified.

3. A transmission mechanism of the character described comprising a transmission housing having journalled therein, a driving shaft, a driven shaft and an idler shaft; said driving and driven shafts projecting from said housing, intermeshing gear wheels on said driving and idler shafts, cooperable gear wheels rotatably fixed on said driven and said idler shafts, one of said last-named wheels being movable longitudinally of its shaft whereby said one wheel may be moved into and out of mesh with the other of said last-named wheels, clutch means having driving and driven members and positioned in said driving shaft, cam means having operative connection to said idler shaft for operation upon rotation thereof, means to disengage said clutch members, a movable cam member having operative engagement with said last-named means, means responsive to a predetermined driven shaft value for moving said cam member and said cam means into engagement whereby to disengage said clutch members, automatic means to move said one gear wheel, and means operable by said disengaging means to actuate said automatic means, substantially as specified.

4. A transmission mechanism of the character described comprising a transmission housing, axially alined driving and driven shafts journalled in said housing and projecting therefrom an idler shaft journalled in said housing, clutch means in said driving shaft, a gear wheel fixed on said driving shaft, a gear wheel fixed on said idler shaft and meshing with said first-named gear wheel, cam means operatively connected to said idler shaft for rotation thereby whereby said cam means is rotated when said clutch means is in engagement, a second gear wheel fixed on said idler shaft, a gear wheel cooperable with said driving shaft gear wheel and said last named gear wheel and being rotatably fixed and longitudinally slidable on said driven shaft, a reciprocable bar member having engagement with said slidable gear wheel, an actuator bar operable to move said bar member in one direction to engage said first-named and said fourth-named gear wheels, means normally acting to move said actuator bar, releasable means resisting movement of said actuator bar, abutment means carried by said bar member and movable into the path of movement of said actuator bar, a restoring bar operable to move said bar member in the opposite direction to disengage said fourth-named gear wheel, means normally acting to move said restoring bar, releasable means resisting movement of said restoring bar, lever means cooperable with said cam means for oscillation thereby, means connecting said lever means and said clutch means whereby oscillation of said lever means will disengage and then engage the members of said clutch means, said last-named means being operable on clutch disengaging movement to release said restoring bar resisting means, means to lock said lever means and said cam means in cooperable engagement, means normally urging said lever means into locked position, means resisting said last-named means, a second bar member operable to move said first-named bar member in said opposite direction to engage said third-named and fourth-named gear wheels, said second bar member having abutment means movable into the path of travel of said actuator bar, electrically operable means for actuating either of said abutment means and said lever resisting means and means operable by said resisting bar to release said actuator bar resisting means, substantially as specified.

5. In a mechanism of the character described, transmission means, clutch means therefor, means operable to actuate said clutch means, means driven by said transmission means, and means responsive to speedometer changes operable to interconnect said driven means and said clutch actuating means, substantially as specified.

6. In a mechanism of the character described, transmission means, clutch means therefor, means operable to actuate said clutch means, means driven by said transmission means, and electrically operated means responsive to predetermined speeds to interconnect said driven means and said clutch actuating means, substantially as specified.

7. A transmission mechanism of the character described, comprising a driving shaft and a driven shaft, a pair of gear wheels adapted operatively to connect said shafts together, one of said wheels being movable into mesh with the other of said wheels, means to move said one wheel, an operating member to actuate said means, movable means automatically responsive to speedometer changes to operatively connect said operating member and said means, and means to move said last-named means whereby said operating member can cause said wheels to mesh, substantially as specified.

8. A transmission mechanism of the character described, comprising a driving shaft and a driven shaft, a pair of gear wheels adapted operatively to connect said shafts together, one of said wheels being movable into mesh with the other of said wheels, means to move said one wheel, an operating member to actuate said means, means resisting operation of said member, movable means to operatively connect said operating member and said means, means to move said last-named means, and means operable upon movement of said movable connecting means to release said resisting means whereby said operating member can cause said wheels to mesh, substantially as specified.

9. A transmission mechanism of the character described, comprising a driving shaft and a driven shaft, a pair of gear wheels adapted operatively to connect said shafts, one of said wheels being movable into and out of mesh with the other of said wheels, an operating member for moving said one wheel, actuating means, normally ineffective means to operatively connect said actuating means and said operating member for movement of said operating member in one direction, a second operating member connected to said first operating member and operable to move said first operating member in the opposite direction, and normally ineffective means to operatively connect said actuating means and said second-named operating member whereby to move said one wheel in the opposite direction, substantially as specified.

10. An automotive power-transmission mechanism comprising, in combination, a driving shaft and a driven shaft, a plurality of gear sets having gear wheels adapted for selective engagement and disengagement to connect the shafts, clutch means in said driving shaft, means for releasing said clutch means, spring actuated means for moving certain of said wheels to cause engagement of said sets, means operable by said driving shaft for actuating said clutch releasing means, means normally acting to hold said releasing means in inactive position, means operable upon actuation of said clutch releasing means for controlling the operation of said spring actuated means, and means to release said holding means, substantially as specified.

11. An automotive power-transmission mechanism comprising, in combination, a driving shaft and a driven shaft, a plurality of gear sets having gear wheels adapted for selective engagement and disengagement to connect the shafts, clutch means in said driving shaft, means for releasing said clutch means, spring actuated means for moving certain of said wheels to cause engagement of said sets, means operable by said driven shaft for actuating said clutch releasing means, means normally acting to hold said releasing means in inactive position, means operable upon actuation of said clutch releasing means for controlling the operation of said spring actuated means, and means to release said holding means, and means operable upon release of said clutch means to move certain of said wheels to cause disengagement of an engaged set, substantially as specified.

12. A transmission mechanism of the character described comprising a driving shaft, a driven shaft, cooperable gear wheels carried by said shafts, clutch means in said driving shaft, electrically controlled cam actuated means for disengaging and engaging said clutch means in sequence, automatic means operable to disengage the gear wheels, means actuated by said cam actuated means to release said automatic means, a second automatic means operable to move certain of said gear wheels into engagement, means operable by said first-named automatic means to release said second-named automatic means, and electrically controlled means responsive to rotational speed of said driven shaft for predetermining said certain gear wheels to be engaged, substantially as specified.

13. An automotive power transmission mechanism comprising, in combination, a gear shift mechanism, a clutch, clutch releasing means, means operated by said clutch releasing means for actuating said gear shifting mechanism, and means operated electrically in response to speed changes for rendering said clutch releasing means and gear shift mechanism actuating means operative.

14. In a mechanism of the character described, a gear shift mechanism, clutch means, means for controlling said clutch means, a series of reciprocatable gear shifting members adapted to be operated by said clutch controlling means and normally in inactive relation thereto, movable means for placing said members in active relation to said clutch controlling means, and means for actuating the last named means in response to speedometer changes.

15. An automotive power transmission mechanism comprising, in combination, gear shifting mechanism adapted to be shifted to change the gear ratio, a clutch, means for controlling said clutch, means for actuating said gear shifting mechanism to vary the ratio thereof, means operated by the clutch controlling means for controlling said gear mechanism actuating means, and means responsive to speed changes for rendering said clutch controlling means operative, said means placing said gear shifting means in operative relation to said clutch controlling means to be actuated thereby.

16. An automotive power transmission mechanism comprising, in combination, gear shift mechanism, a clutch, a cam member operated by the transmission mechanism, means operated by the cam member for releasing said clutch, means for retaining said last named means in inactive relation to said cam member, means for actuating said gear shift mechanism operated by the clutch releasing means, means movable to place said last named means in active relation to said clutch releasing means, and means for rendering said clutch releasing and gear shifting means active.

17. A transmission mechanism of the character described comprising a gear shift mechanism including an idler shaft, cam means rotated by said idler shaft, clutch means, means to disengage said clutch means including a relatively movable cam member, means for causing said cam member to engage said rotating cam means to effect the clutch releasing operation, and means operated by the clutch disengaging means for causing the gear shift.

18. A transmission mechanism of the character described comprising a gear shift mechanism including an idler shaft, a clutch, a gear rotated by said idler shaft, a cam ring carried by said gear to rotate therewith and free to rotate on the gear when the clutch is disengaged, means actuated by said cam ring for controlling said clutch, means controlled by said last named means for actuating the gear shift mechanism, and means for controlling said two last named and means for effecting the clutch controlling and gear shifting operation.

19. A transmission mechanism of the character described comprising a gear shift mechanism, clutch means, cam actuated means for disengaging and engaging said clutch means in sequence, gear shift operating members, means controlled by the cam actuated means for resetting the gear shift operating members, means controlled by said cam actuated means and released by operation of the resetting means for actuating the gear shift operating members to change the gear ratio, and electrically operated means for rendering said gear shift operating members operable, said last named means causing operation of the cam actuated means.

20. A transmission mechanism of the character described comprising a gear shift mechanism, a clutch, cam actuated means for releasing said clutch, means for retaining said last named means in inoperative relation to said cam, a plurality of members for shifting the gears, means controlled by said clutch controlling means for returning said members to neutral position, means controlled by said clutch controlling means for actuating said members to cause engagement of the gears, means on each member adapted to be moved individually into the path of travel of said last named means, electromagnetic means associated with said retaining means and with each of said individually movable means, the electromagnetic means for said retaining means being in circuit with each of the other electromagnetic means, and means responsive to speed changes for simultaneously closing the circuits of the electromagnetic means for said retaining means and of one of the other electromagnetic means, the circuits of the latter being closed in succession in accordance with the speed.

21. A mechanism as defined in claim 20 in which the circuits of said speed responsive means include sets of contacts relatively movable at low speed to open the circuits of the several gear shifting controlling electromagnetic means and to close an independent circuit through the electromagnetic means for controlling the clutch.

22. In a transmission for motor vehicles including gear shift mechanism, a plurality of electromagnetic devices including circuits for controlling said gear shift mechanism, clutch means, an electromagnetic device in series with said first named electromagnetic devices for controlling said clutch means upon operation of any of said first named electromagnetic devices, means responsive to speed changes for operating said first named electromagnetic devices in a sequence depending upon the speed, an auxiliary circuit between said speed responsive means and said second named electromagnetic device, and means under control of certain of the vehicle speed controlling means for controlling said first named circuits and said last named circuit in inverse relation to each other, said last named means including contacts in said auxiliary circuit adapted to be closed when said first named circuits are open for rendering said second named electromagnetic device operative in the low speed position of said speed responsive means.

FULTON C. WORDEN.